US011671196B2

(12) United States Patent
Yanagimachi

(10) Patent No.: US 11,671,196 B2
(45) Date of Patent: Jun. 6, 2023

(54) OPTICAL NETWORK MANAGEMENT DEVICE, OPTICAL NETWORK SYSTEM, OPTICAL NETWORK MANAGEMENT METHOD, AND OPTICAL NETWORK MANAGEMENT PROGRAM

(71) Applicant: NEC Corporation, Tokyo (JP)

(72) Inventor: Shigeyuki Yanagimachi, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/695,975

(22) Filed: Mar. 16, 2022

(65) Prior Publication Data
US 2022/0303039 A1 Sep. 22, 2022

(30) Foreign Application Priority Data
Mar. 22, 2021 (JP) .............................. JP2021-047715

(51) Int. Cl.
*H04J 14/04* (2006.01)
*H04J 14/02* (2006.01)
(Continued)

(52) U.S. Cl.
CPC ...... *H04J 14/0221* (2013.01); *H04B 10/0795* (2013.01); *H04B 10/564* (2013.01);
(Continued)

(58) Field of Classification Search
CPC ............... H04J 14/0221; H04J 14/0201; H04J 14/0227; H04J 14/0257; H04J 14/04;
(Continued)

(56) References Cited

U.S. PATENT DOCUMENTS 6,259,555 B1 * 7/2001 Meli .................... H04J 14/0221
359/337
6,965,712 B1 * 11/2005 Lewis .................. H04B 10/291
385/27

(Continued)

FOREIGN PATENT DOCUMENTS

JP 2013-009264 A 1/2013
JP 2014-165595 A 9/2014
(Continued)

OTHER PUBLICATIONS

Sawa et al, Physical Layer Aware Routing, Spectrum, and Core Allocation, May 2018, ICC, All Document. (Year: 2018).*
(Continued)

*Primary Examiner* — Dibson J Sanchez
(74) *Attorney, Agent, or Firm* — Sughrue Mion, PLLC

(57) ABSTRACT

An optical network management device (100) which assigns a path from a transmitting node to a receiving node in an optical network system including a multi-core optical fiber, includes at least one processor, the processor being configured to carry out: a core extraction process of extracting a core constituting the path; and a path assignment process of selecting, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the path assignment process including preferentially assigning, to the first wavelength region, the path having a specific attribute.

9 Claims, 10 Drawing Sheets

(51) Int. Cl.
  *H04B 10/564* (2013.01)
  *H04B 10/079* (2013.01)
  *H04B 10/2581* (2013.01)
  *H04Q 11/00* (2006.01)
  *H04B 10/291* (2013.01)

(52) U.S. Cl.
  CPC ...... *H04J 14/0201* (2013.01); *H04B 10/2581* (2013.01); *H04B 10/291* (2013.01); *H04J 14/0227* (2013.01); *H04J 14/0257* (2013.01); *H04J 14/04* (2013.01); *H04Q 2011/0064* (2013.01)

(58) Field of Classification Search
  CPC ............. H04J 14/0283; H04B 10/0795; H04B 10/564; H04B 10/2581; H04B 10/291; H04Q 2011/0064
  USPC .................................................. 398/43–103
  See application file for complete search history.

(56) References Cited

U.S. PATENT DOCUMENTS

| | | | | |
|---|---|---|---|---|
| 8,995,833 | B2* | 3/2015 | Guy | H04J 14/0246 398/49 |
| 10,511,381 | B2* | 12/2019 | Oda | H04L 12/437 |
| 10,516,482 | B1* | 12/2019 | Schmogrow | H04J 14/0269 |
| 10,615,868 | B2* | 4/2020 | Oda | H04B 10/2581 |
| 10,623,837 | B2* | 4/2020 | Gao | H04J 14/0256 |
| 2005/0024715 | A1* | 2/2005 | Inoue | H04J 14/0221 359/337 |
| 2011/0317255 | A1* | 12/2011 | Shukunami | H04B 10/294 359/333 |
| 2013/0209106 | A1* | 8/2013 | Mukasa | H04B 10/2507 398/79 |
| 2013/0236175 | A1* | 9/2013 | Sethumadhavan | G02B 6/29383 398/43 |
| 2014/0241712 | A1 | 8/2014 | Sugawara et al. | |
| 2014/0294384 | A1* | 10/2014 | Wakabayashi | H04J 14/0257 398/49 |
| 2015/0104175 | A1* | 4/2015 | Fu | H04J 14/02 398/79 |
| 2015/0341284 | A1* | 11/2015 | Kang | H04L 47/805 455/513 |
| 2019/0140418 | A1* | 5/2019 | Le Taillandier De Gabory | H01S 3/06754 |
| 2020/0136743 | A1 | 4/2020 | Fujisawa et al. | |
| 2020/0266894 | A1* | 8/2020 | Shen | H04J 14/0271 |
| 2020/0389248 | A1* | 12/2020 | Goto | H04J 14/04 |
| 2021/0409112 | A1* | 12/2021 | Chen | H04J 14/0291 |

FOREIGN PATENT DOCUMENTS

| | | |
|---|---|---|
| JP | 2018-174417 A | 11/2018 |
| WO | 2014/141533 A1 | 9/2014 |
| WO | 2019/008718 A1 | 1/2019 |

OTHER PUBLICATIONS

Zhao et al, Crosstalk Aware Spectrum Defragmentation Based on Spectrum Compactness, Jan. 2018, IEEE, All Document. (Year: 2018).*

Li et al, Routing, Wavelength and Core Allocation Planning for Multi Core Fiber Networks, Dec. 2015, OECC, All Document. (Year: 2015).*

Muhammad et al, Routing, Spectrum and Core Allocation in Flexgrid SDM Networks with Multi-core Fibers, May 2014, ONDM, All Document. (Year: 2014).*

* cited by examiner

OPTICAL NETWORK MANAGEMENT DEVICE, OPTICAL NETWORK SYSTEM, OPTICAL NETWORK MANAGEMENT METHOD, AND OPTICAL NETWORK MANAGEMENT PROGRAM

This Nonprovisional application claims priority under 35 U.S.C. § 119 on Patent Application No. 2021-047715 filed in Japan on Mar. 22, 2021, the entire contents of which are hereby incorporated by reference.

TECHNICAL FIELD

The present invention relates to a feature for accommodating a path in an optical network system which includes a multi-core fiber.

BACKGROUND ART

In recent years, traffic flowing through networks continues to grow rapidly due to rapid spread of mobile terminals that are typified by smartphones and due to communication of large-volume data such as high-definition images as a result of sophistication of terminals. In light of this, various transmission capacity expansion technologies have been developed. For example, in order to expand a transmission capacity per optical fiber, research and development of multi-core optical fibers (MCFs) in which a plurality of cores are provided in one cladding is in progress.

Further, technological development for effectively utilizing limited frequency resources is also in progress. For example, research and development is in progress for a network control technology according to which the frequency utilization efficiency is enhanced by reduction of path blocking, the reduction of path blocking being achieved by assigning a path in accordance with signal quality of a transmission channel, a band of a communication signal, a communication distance, and/or the like.

In an MCF, since crosstalk from an adjacent core differs depending on the physical position of a core, characteristics vary from core to core. As a network control technology which takes this point into consideration, Patent Literatures 1 and 2 disclose a method for effectively utilizing cores by assigning a main signal to a peripheral core having a good characteristic and assigning a monitor signal, which is lower in speed than the main signal, to a central core having an inferior characteristic. Further, Patent Literature 3 discloses a method for assigning a path in accordance with difference in signal quality between cores and a transmission distance of a main signal.

CITATION LIST

Patent Literature

[Patent Literature 1]
Pamphlet of International Publication No. WO 2014/141533
[Patent Literature 2]
Japanese Patent Application Publication Tokukai No. 2014-165595
[Patent Literature 3]
Japanese Patent Application Publication Tokukai No. 2018-174417

SUMMARY OF INVENTION

Technical Problem

However, what is considered in conventional technologies is no more than path assignment in view of difference in characteristic between cores in a transmission channel. Therefore, if wavelength utilization efficiency can be enhanced, by a novel method, in an optical network system which includes a multi-core optical fiber, such a novel method will be useful.

An aspect of the present invention is attained in view of the above problem. An example of a purpose of an aspect of the present invention is to provide a novel feature for enhancement of wavelength utilization efficiency in an optical network system which includes a multi-core optical fiber.

Solution to Problem

An optical network management device in accordance with an aspect of the present invention is an optical network management device which assigns a path from a transmitting node to a receiving node in an optical network system including a multi-core optical fiber, the optical network management device including at least one processor, the processor being configured to carry out:

a core extraction process of extracting a core constituting the path; and a path assignment process of selecting, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the path assignment process including preferentially assigning, to the first wavelength region, the path having a specific attribute.

An optical network management method in accordance with an aspect of the present invention is an optical network management method for assigning a path from a transmitting node to a receiving node in an optical network system including a multi-core optical fiber, the optical network management method including the steps of: extracting a core constituting the path; and selecting, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the step of selecting a wavelength to which the path is to be assigned including preferentially assigning, to the first wavelength region, the path having a specific attribute.

A non-transitory storage medium in accordance with an aspect of the present invention is a non-transitory storage medium in which an optical network management program is stored, the optical network management program being for causing a computer to function as an optical network management device which assigns a path from a transmitting node to a receiving node in an optical network system including a multi-core optical fiber, the program causing the computer to function as a core extraction section configured to extract a core constituting the path, and a path assignment section configured to select, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the path assignment section being configured to preferentially assign, to the first wavelength region, the path having a specific attribute.

Advantageous Effects of Invention

An aspect of the present invention makes it possible to enhance wavelength utilization efficiency in an optical network system which includes a multi-core optical fiber.

DESCRIPTION OF EMBODIMENTS

Illustrative Embodiment 1

The following will discuss in detail Illustrative Embodiment 1 of the present invention, with reference to drawings. Illustrative Embodiment 1 is a basic embodiment of illustrative embodiments which will be described later.

<Configurations of System and Device>

Figure 1:
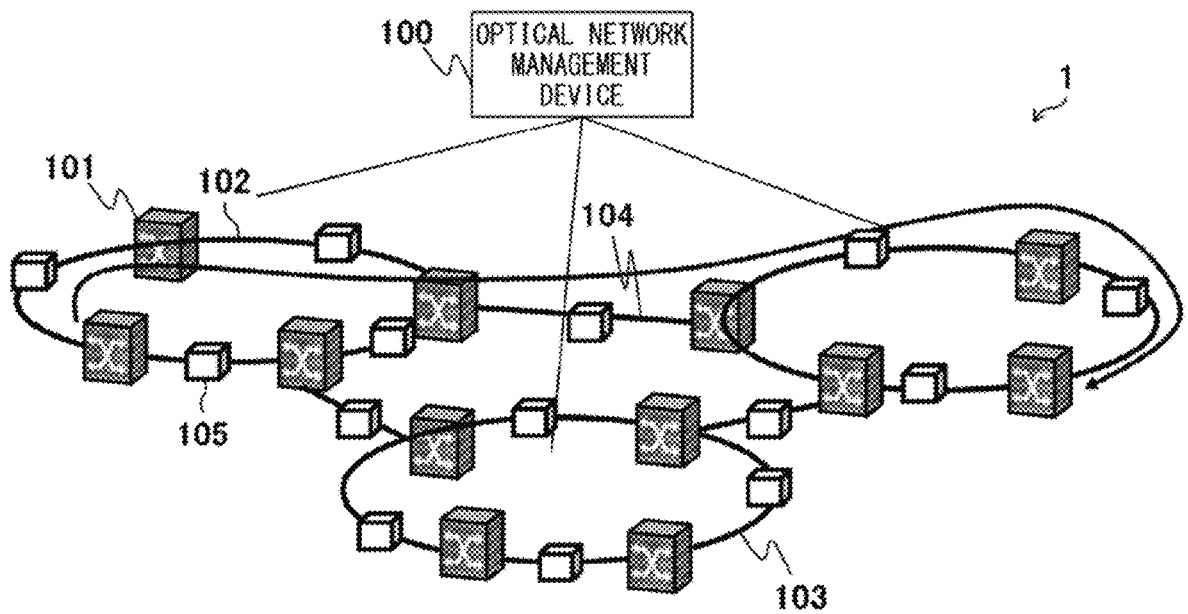
FIG. 1 is a view schematically illustrating an example of a configuration of an optical network system in accordance with Illustrative Embodiment 1 of the present invention.
Figure 2:
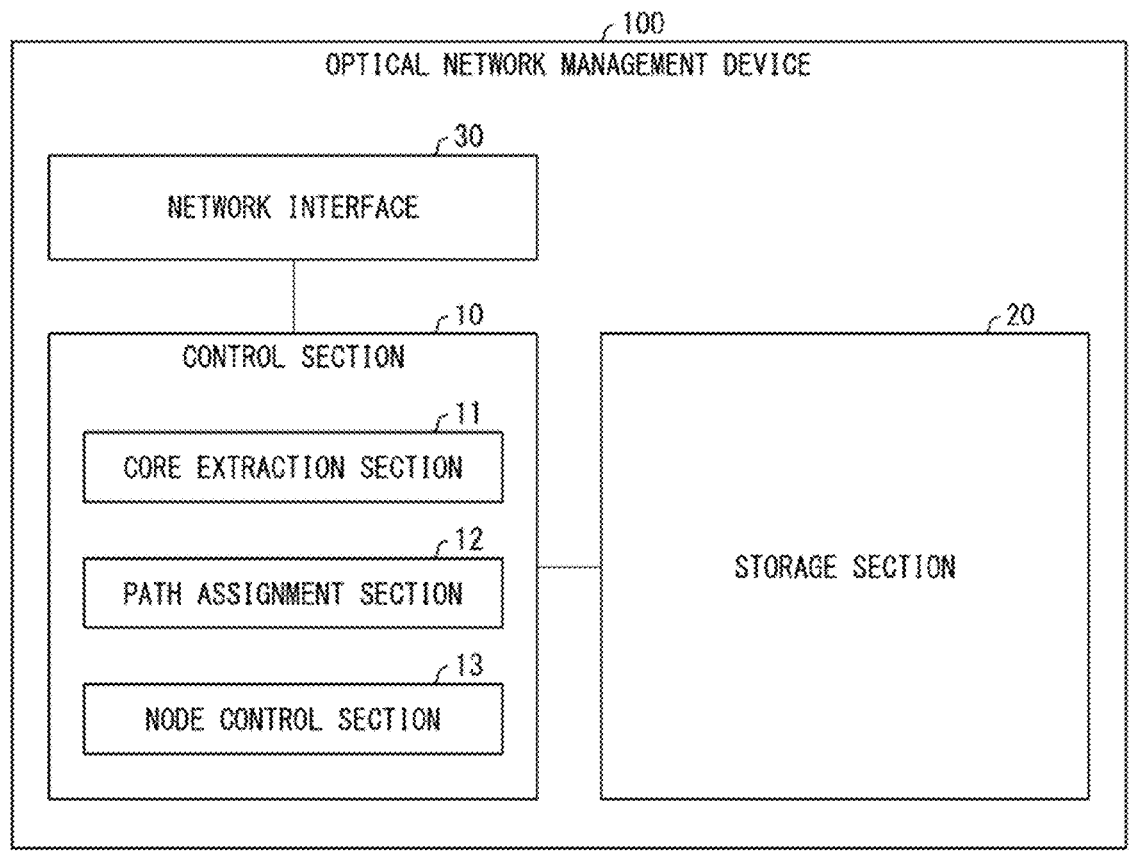
FIG. 2 is a block diagram illustrating an example of a configuration of the optical network management device in accordance with Illustrative Embodiment 1 of the present invention.

The following will discuss configurations of an optical network system 1 and an optical network management device 100 in accordance with Illustrative Embodiment 1, with reference to FIGS. 1 and 2. FIG. 1 is a view schematically illustrating an example of the configuration of the optical network system 1. FIG. 2 is a block diagram illustrating an example of the configuration of the optical network management device 100.

The optical network system 1 is an optical network system which includes a multi-core optical fiber. In an aspect, the optical network system 1 may be a heterogeneous optical network system in which a multi-core optical fiber and a single-core optical fiber are mixedly present.

As illustrated in FIG. 1, the optical network system 1 includes the optical network management device 100, nodes 101, optical transmission channels 102, and optical amplifiers 105.

The optical network management device 100 is also referred to as "network management system (NMS)", and controls the optical network system 1. In an aspect, the optical network management device 100 controls each of the nodes 101 and assigns a path from a transmitting node to a receiving node.

Each of the optical transmission channels 102 each include a ring 103 for connecting a plurality of nodes 101, and a connection link 104 for connecting a plurality of rings 103. The optical transmission channel 102 includes a multi-core optical fiber. The optical transmission channel 102 may be partially composed of a multi-core optical fiber while partially composed of a single-core optical fiber. Alternatively, the optical transmission channel may be entirely composed of a multi-core optical fiber.

To the optical transmission channel 102, the optical amplifier 105 is attached. The optical amplifier 5 compensates transmission loss of light which passes through the optical transmission channel 102. The optical amplifier 105 has an amplification gain which is arranged so as to be larger in a first wavelength region than in a second wavelength region.

As illustrated in FIG. 2, the optical network management device 100 includes a control section 10, a storage section 20, and a network interface 30.

The control section 10 includes a core extraction section 11, a path assignment section 12 and a node control section 13. The core extraction section 11 extracts, from cores which are provided in each of the optical transmission channels 102 in the optical network system 1, a core which constitutes the path that links the transmitting node to the receiving node.

The path assignment section 12 selects, in accordance with an attribute of the path, a wavelength to which the path is to be assigned. The attribute of the path is not particularly limited, and includes, for example, a band, a distance, a level of importance, a type, and/or the like of the path. The type of the path is not particularly limited, and is, for example, an active system path type or a spare system path (protection path) type. In an aspect, the path assignment section 12 preferentially assigns, to the first wavelength region, a path having a specific attribute.

The node control section 13 controls each of the nodes 101 so that the path is assigned to the wavelength of the core which has been extracted by the core extraction section 11, the wavelength having been allocated by the path assignment section 12.

The storage section 20 stores program data to be executed by the control section 10, data to be referred to when the program data is executed, and/or the like data. The storage section 20 is composed of, for example, a non-volatile storage device such as a hard disk and/or a flash memory.

The network interface 30 is an interface which is used for communication with any other device (e.g., a node controller of a node 101).

<Flow of Optical Network Management Method>

Figure 3:
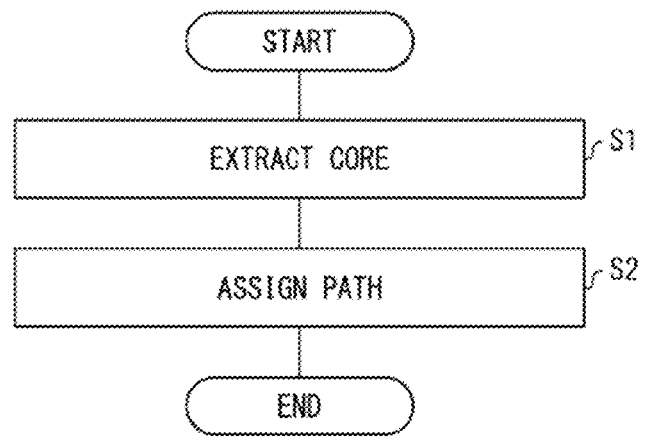
FIG. 3 is a flow chart showing an example of a flow of an optical network management method in accordance with Illustrative Embodiment 1 of the present invention.

The following will discuss a flow of an optical network management method in accordance with Illustrative Embodiment 1, with reference to FIG. 3. FIG. 3 is a flow chart illustrating an example of the flow of the optical network management method in accordance with Illustrative Embodiment 1. As shown in FIG. 3, the optical network management method in accordance with Illustrative Embodiment 1 includes at least steps S1 and S2.

In step S1 (core extraction process), the core extraction section 11 extracts, from cores which are provided in each of the optical transmission channels 102 in the optical network system 1, a core which constitutes the path that links the transmitting node to the receiving node.

In the step S2 (path assignment process), the path assignment section 12 selects, in accordance with an attribute of the path, a wavelength to which the path is to be assigned. In an aspect, the path assignment section 12 preferentially assigns, to the first wavelength region, a path having a specific attribute.

The specific attribute here refers to an attribute which indicates that communication should be preferentially performed. Examples of the specific attribute include, but are not limited to, "broadband" for the band of the path, "long distance" for the distance of the path, "important" for the level of importance of the path, and "active system" for the type of the path. It is possible to enhance wavelength utilization efficiency by preferentially assigning a path having such an attribute, to a wavelength region which is preferable in wavelength characteristic of the optical transmission channel 102, that is, to the first wavelength region which has a large amplification gain of the optical amplifier 105.

As described above, the optical network management device 100 in accordance with Illustrative Embodiment 1 is an optical network management device 100 which assigns a path from a transmitting node to a receiving node in the optical network system 1 including a multi-core optical fiber, the optical network management device 100 being configured to include: the core extraction section 11 configured to extract a core constituting the path; and the path assignment section 12 configured to select, in accordance with an attribute of the path, a wavelength to which the path is to be assigned, the multi-core optical fiber having the optical amplifier 105 attached thereto, the optical amplifier 105 having an amplification gain that is larger in the first wavelength region than in the second wavelength region, the path assignment section 12 preferentially assigning, to the first wavelength region, the path having a specific attribute.

Further, the optical network management method in accordance with Illustrative Embodiment 1 is an optical network management method for assigning a path from a transmitting node to a receiving node in an optical network system including a multi-core optical fiber, the optical network management method being configured to include the steps of: extracting a core constituting the path; and selecting, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the step of selecting a wavelength to which the path is to be assigned including preferentially assigning, to the first wavelength region, the path having a specific attribute.

Therefore, according to the optical network management device and the optical network management method in accordance with Illustrative Embodiment 1, it is possible to assign a path in accordance with an attribute of the path, in view of a wavelength characteristic of an optical transmission channel. Consequently, it is possible to enhance wavelength utilization efficiency in an optical network system including a multi-core optical fiber. Further, since the wavelength utilization efficiency of the whole of the optical network system can be enhanced, it is possible to reduce cost of the whole of the optical network system.

Figure 4:
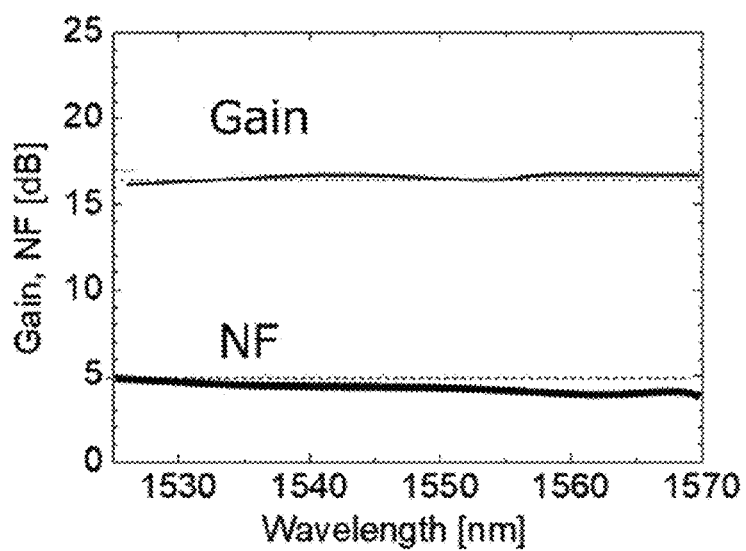
FIG. 4 is a graph showing an example of wavelength characteristics of an optical amplifier.

It should be noted that, as described above, in conventional technologies, although it has been considered to assign a path in view of difference in wavelength characteristic between cores in an optical transmission channel, assignment of a path in view of the wavelength characteristic of the transmission channel itself as in Illustrative Embodiment 1 has not been considered. The reason for this is as follows. A typical optical amplifier, which is used in an optical network system, has wavelength characteristics which are equalized as shown in FIG. 4. With such wavelength characteristics, since the difference in wavelength characteristic between wavelength bands (e.g., C band and L band) to be used is small, the need to consider the wavelength characteristics is low.

Figure 5:
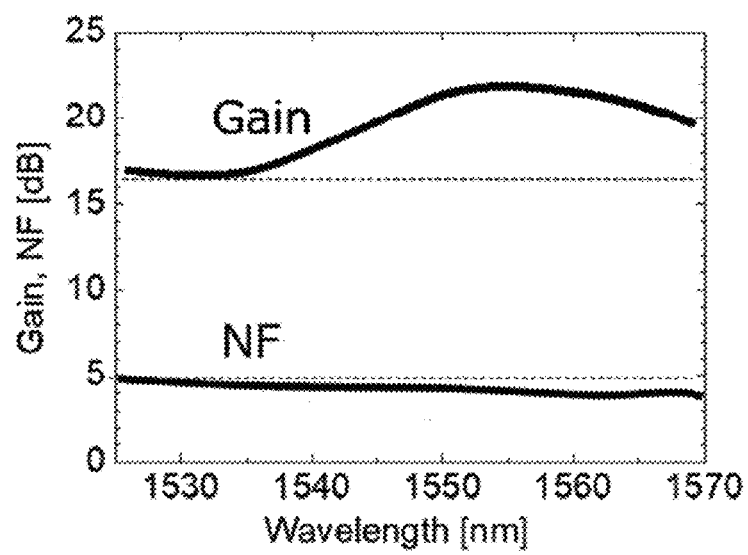
FIG. 5 is a graph showing an example of wavelength characteristics of an optical amplifier.

However, on the basis of unique knowledge of the inventors of the present invention, the wavelength utilization efficiency in an optical network system can be enhanced by taking into consideration wavelength characteristics of a transmission channel itself. This is because an optical amplifier which has wavelength characteristics that are not equalized has a wavelength region in which an amplification gain is large, as shown in FIG. 5. In equalization, it is not possible to cause lift in a wavelength region in which the amplification gain is small. Accordingly, the wavelength characteristics which are equalized as shown in FIG. 4 are obtained by causing, by a frequency shaping device, attenuation in a wavelength region in which the amplification gain is large, so that this wavelength region matches a wavelength region in which the amplification gain is small. Therefore, from the viewpoint of the wavelength utilization efficiency, there is a loss. According to Illustrative Embodiment 1, it is possible to reduce the above loss and further enhance the frequency utilization efficiency.

Illustrative Embodiment 2

The following will discuss in detail Illustrative Embodiment 2 of the present invention, with reference to drawings. Note that any constituent element that is identical in function to a constituent element described in the above Illustrative Embodiment 1 is given the same reference numeral, and a description thereof will be omitted where appropriate.

<Configurations of System and Device>

An optical network system 1 and an optical network management device 100 in accordance with Illustrative Embodiment 2 are configured as in Illustrative Embodiment 1. In Illustrative Embodiment 2, the following will discuss detailed configurations of the optical network system 1 and the optical network management device 100.

(Multi-Core Optical Fiber)

Figure 12:
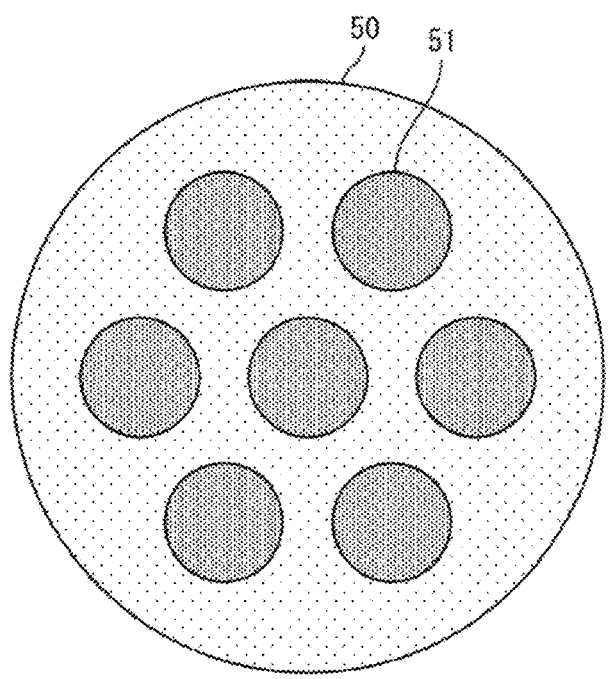
FIG. 12 is a view schematically illustrating an example of a structure of a multi-core optical fiber.

FIG. 12 is a view schematically illustrating a structure of a 7-core multi-core optical fiber as an example of a structure of a multi-core optical fiber. Note that multi-core optical fibers which have been developed are broadly divided into uncoupled multi-core optical fibers and coupled multi-core optical fibers.

Figure 13:
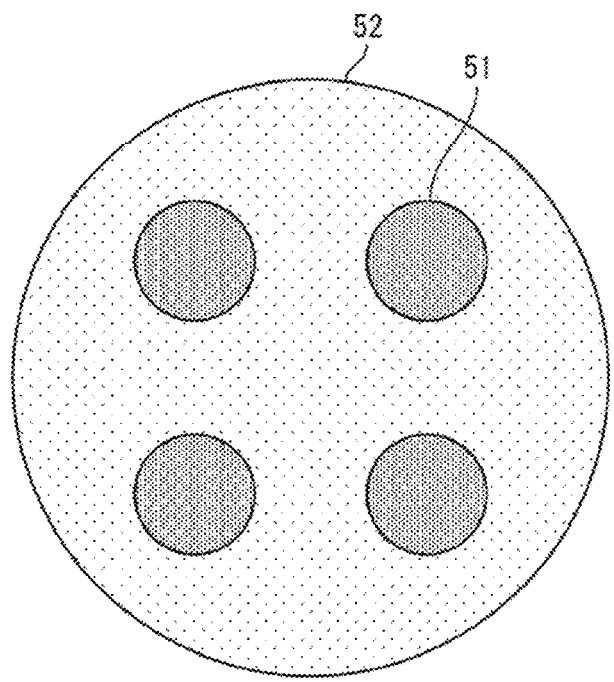
FIG. 13 is a view schematically illustrating an example of a structure of a multi-core optical fiber.

FIG. 13 illustrates a structure of a 4-core uncoupled multi-core optical fiber as an example of a structure of an uncoupled multi-core optical fiber. The uncoupled multi-core optical fiber is an optical fiber in which a space is provided between adjacent cores so that crosstalk between the cores is reduced. In the uncoupled multi-core optical fiber, each core can be used as an independent optical transmission channel. Therefore, it is possible to directly use optical communication technologies which have been developed for conventional single-core optical fibers.

Figure 14:
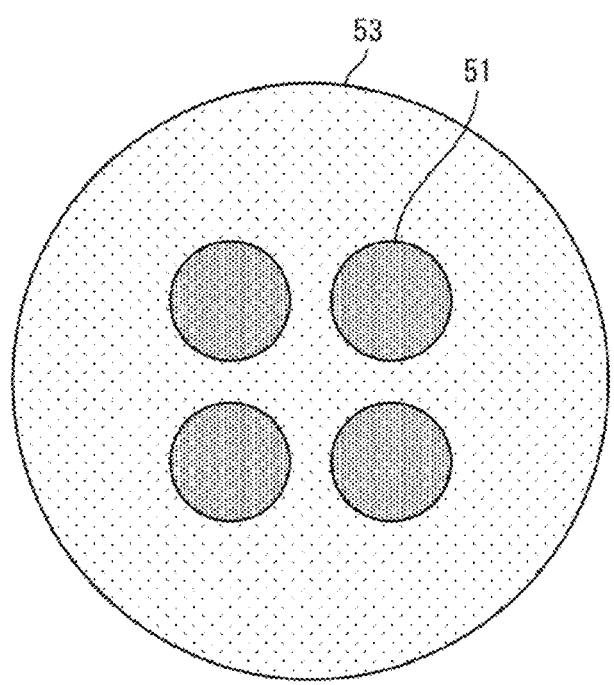
FIG. 14 is a view schematically illustrating an example of a structure of a multi-core optical fiber.

FIG. 14 illustrates a structure of a 4-core coupled multi-core optical fiber as an example of a structure of a coupled multi-core optical fiber. The coupled multi-core optical fiber is an optical fiber in which a high core density is realized by narrowing a space between adjacent cores. In the coupled multi-core optical fiber, since crosstalk occurs between each pair of cores, a multi-input multi-output (MIMO) process with use of a digital signal processor (DIP) or the like is needed in an optical receiver.

In Illustrative Embodiment 2, the uncoupled multi-core optical fiber is used as the multi-core optical fiber which constitutes an optical transmission channel 102.

(Optical Amplifier)

Figure 6:
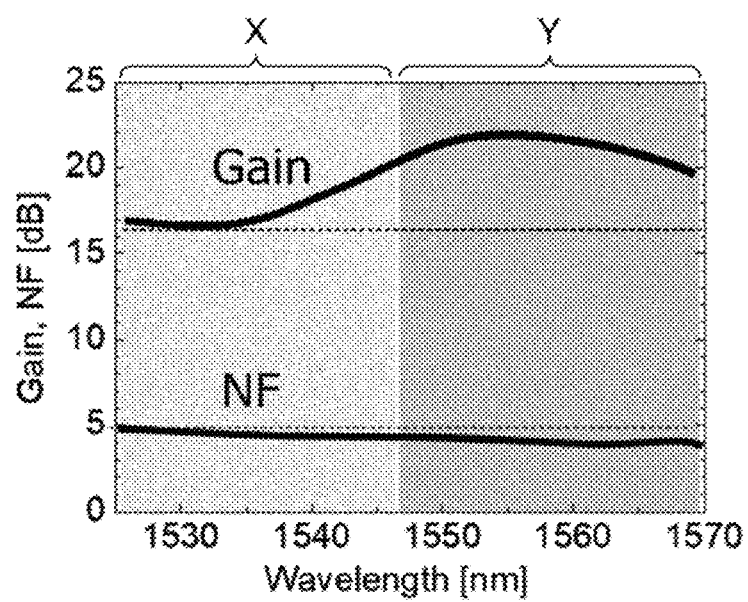
FIG. 6 is a graph showing a relationship between wavelength characteristics of the optical amplifier in accordance with Illustrative Embodiment 1 of the present invention and wavelengths to which paths are assigned.

FIG. 6 is a graph showing wavelength characteristics of an optical amplifier 105 in accordance with Illustrative Embodiment 2. As illustrated in FIG. 6, the optical amplifier 105 has an amplification gain which is larger in a first wavelength region Y than in a second wavelength region X.

It should be noted that in Illustrative Embodiment 2, although it is preferable to use, as the optical amplifier 105, an optical amplifier which has wavelength characteristics that are not equalized, the optical amplifier 105 is not limited to such an optical amplifier and may be an optical amplifier which has wavelength characteristics that are equalized. Even in the case of the optical amplifier having wavelength characteristics that are equalized, the wavelength characteristics are not perfectly constant with respect to wavelengths. Such an optical amplifier includes a first wavelength region in which the amplification gain is relatively large and a second wavelength region in which the amplification gain is relatively small. Therefore, the wavelength utilization efficiency can be enhanced by applying the configuration of Illustrative Embodiment 2.

(Nodes)

Figure 7:
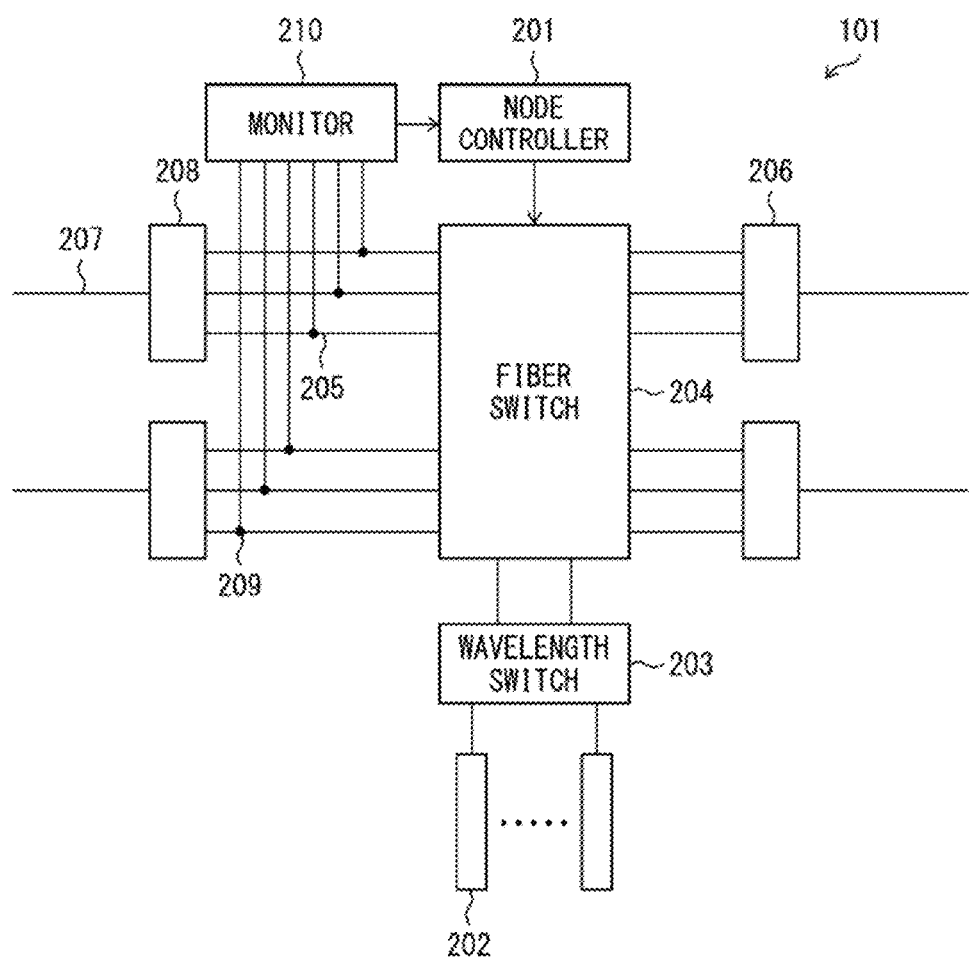
FIG. 7 is a block diagram illustrating an example of a configuration of a node in accordance with Illustrative Embodiment 2 of the present invention.

FIG. 7 is a block diagram illustrating an example of a configuration of nodes 101 for use in Illustrative Embodiment 2. As illustrated in FIG. 7, in an example, each of the nodes 101 includes a node controller 201, transponders 202, a wavelength switch 203, a fiber switch 204, single-core optical fibers 205, FAN-INs 206, FAN-OUTs 208, tap couplers 209 and a monitor 210. Each node 101 is connected to multi-core optical fibers 207 each of which constitute the optical transmission channel 102.

The FUN-OUTs 208 each are connected to a corresponding multi-core optical fiber 207 which constitutes the optical transmission channel 102. The FAN-OUT 208 separates an output from the multi-core optical filter 207 on a per-core basis into respective outputs from cores of the multi-core optical fiber 207, and outputs each of the outputs to corresponding one of the single-core optical fibers 205. The single-core optical fibers 205 receive the respective outputs from the FAN-OUT 208. The single-core optical fibers 205 are provided with the fiber switch 204. The fiber switch 204 switches a connection between single-core optical fibers 205 between which the fiber switch 204 is provided. The fiber switch 204 switches, by switching of the connection, a route of an optical signal which is to pass through the single-core optical fibers 205. The FAN-IN 206 bundles respective outputs from the single-core optical fibers 205 and passes these outputs to another one of the multi-core optical fibers 207.

The wavelength switch 203 receives some of the outputs from the fiber switch 204, and switches a wavelength unit. The transponders 202 transmit and receive optical signals.

To the single-core optical fibers 205, the tap couplers 209 are attached. The tap couplers 209 each cause a portion of the optical signal to branch off. The portion of the optical signal having branched off via the tap coupler 209 is inputted to the monitor 210. The node controller 201 controls the fiber switch 204 and the wavelength switch 203, according to monitor information which has been received from the monitor 210.

<Flow of Optical Network Management Method>

Figure 8:
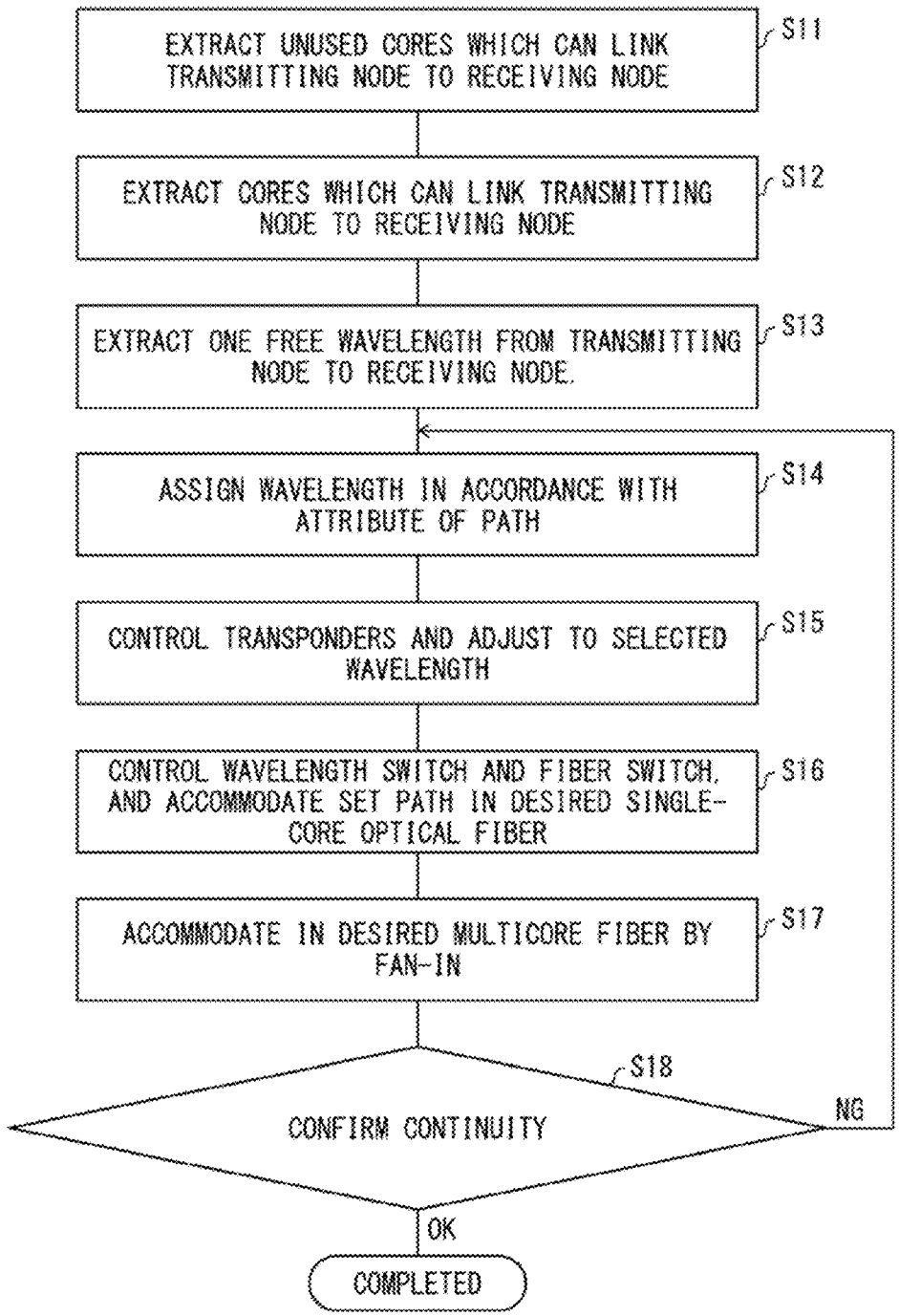
FIG. 8 is a flow chart showing an example of a flow of an optical network management method in accordance with Illustrative Embodiment 2 of the present invention.

The following will discuss a flow of an optical network management method in accordance with Illustrative Embodiment 2, with reference to FIG. 8. FIG. 8 is a flow chart illustrating an example of the flow of the optical network management method in accordance with Illustrative Embodiment 2. As shown in FIG. 8, the optical network management method in accordance with Illustrative Embodiment 2 includes at least steps S11 to S18.

In step S11 (core extraction process), a core extraction section 11 extracts unused cores from among cores of the optical fibers which constitute a plurality of optical transmission channels 102 which can link the transmitting node to the receiving node. Note that the "unused cores" each refer to a core which has a free wavelength and which can be used to form a new path.

Next, in step S12 (core extraction process), the core extraction section 11 extracts, from among the unused cores which have been extracted, cores which can link the transmitting node to the receiving node.

Next, in step S13 (path assignment process), a path assignment section 12 extracts one free wavelength that is common to each of the cores which have been extracted by the core extraction section 11 and which can link the transmitting node to the receiving node.

Next, in step S14 (path assignment process), the path assignment section 12 allocates a wavelength in accordance with an attribute of the path.

In an aspect, the path assignment section 12 preferentially assigns, to the first wavelength region Y, a path having a certain attribute. In an aspect, the path assignment section 12 preferentially assigns, to the second wavelength region X, a path having an attribute that is different from the specific attribute. In this manner, depending on respective attributes of paths, the paths are separately assigned to the wavelength region Y in which the amplification gain is large and to a wavelength region X in which the amplification gain is small. This makes it possible to further enhance the wavelength utilization efficiency in the optical network system 1.

In an aspect, the path assignment section 12 may assign a wavelength in accordance with a band of the path. For example, as in an example shown in FIG. 6, the path assignment section 12 may assign a broadband path of, for example, 200 Gbps, to the wavelength region Y on a longer wavelength side having a good wavelength characteristic, and assign a narrowband path of, for example, 100 Gbps, to the wavelength region X on a shorter wavelength side having an inferior wavelength characteristic.

In an aspect, the path assignment section 12 may assign a wavelength in accordance with a level of importance of the path. For example, the path assignment section 12 may assign an active path (active system path) of high importance, to the wavelength region Y on a longer wavelength side having a good wavelength characteristic, and assign a protection path (spare system path) of low importance, to the wavelength region X on a shorter wavelength side having an inferior wavelength characteristic.

In an aspect, the path assignment section 12 may assign a wavelength depending on whether the path is an active system path or a spare system path. For example, the path assignment section 12 may assign an active path (active system path) to the wavelength region Y on a longer wavelength side having a good wavelength characteristic, and assign a protection path (spare system path) to the wavelength region X on a shorter wavelength side having an inferior wavelength characteristic.

Further, in an aspect, the path assignment section 12 may assign a wavelength according to a combination of criteria described above.

Next, in step S15 (node control process), a node control section 13 controls the node controller 201 so as to realize a set path which has been assigned by the path assignment section 12. The node controller 201 controls the transponders 202 so as to adjust, to the wavelength which has been assigned to the set path, a wavelength at which the transponders 202 carry out transmission/reception.

Next, in step S16 (node control process), the node controller 201 controls the wavelength switch 203 and the fiber switch 204, so that the set path is accommodated in a desired single-core optical fiber 205.

Next, in step S17 (node control process), the set path is accommodated, by the FAN-IN 206, in a desired multi-core optical fiber 207.

Next, in step S18 (node control process), the node control section 13 carries out signaling for confirming continuity of the set path. If signal communication is impossible, the process returns to step S14, and another wavelength is assigned to the path. If signal communication is confirmed, a control section 10 completes a series of processes.

Illustrative Embodiment 3

The following will discuss in detail Illustrative Embodiment 3 of the present invention, with reference to drawings. Note that any constituent element that is identical in function to a constituent element described in the above Illustrative Embodiment 1 or 2 is given the same reference numeral, and a description thereof will be omitted where appropriate.

An optical network system 1 and an optical network management device 100 in accordance with Illustrative Embodiment 3 are configured as in Illustrative Embodiment 1 or 2. In Illustrative Embodiment 3, the following will discuss a configuration in which a path assignment section 12 divides and assigns a path to a plurality of wavelengths.

Figure 9:
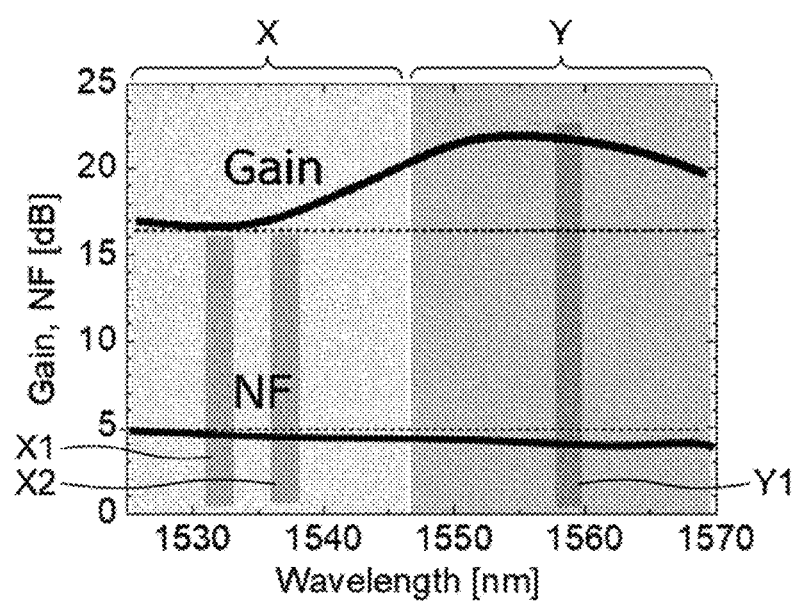
FIG. 9 is a graph showing a relationship between wavelength characteristics of an optical amplifier in accordance with Illustrative Embodiment 3 of the present invention and wavelengths to which paths are assigned.

FIG. 9 is a graph showing a relationship between wavelength characteristics of an optical amplifier 105 in accordance with Illustrative Embodiment 3 and wavelengths to which paths are assigned. As shown in FIG. 9, instead of assigning a path to a wavelength Y1 of a first wavelength region Y, the path assignment section 12 may divide and assign the path to a plurality of wavelengths X1 and X2 of a second wavelength region X. In this manner, dividing the path makes it possible to efficiently assign the path even when the path is, for example, a broadband path. The following will discuss a detailed example.

Figure 10:
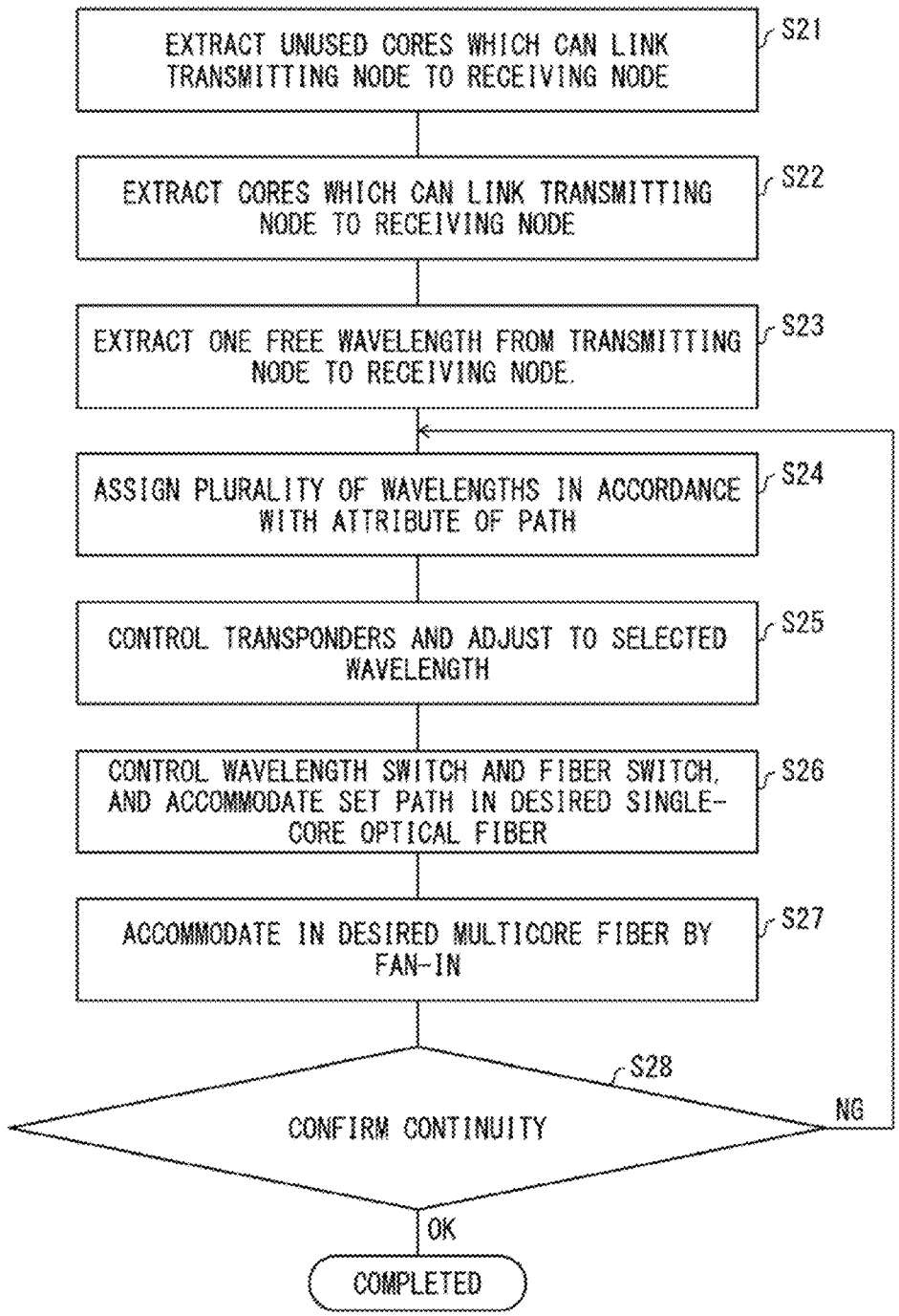
FIG. 10 is a flow chart showing an example of a flow of an optical network management method in accordance with Illustrative Embodiment 3 of the present invention.

FIG. 10 is a flow chart illustrating an example of a flow of an optical network management method in accordance with Illustrative Embodiment 3. As shown in FIG. 10, the optical network management method in accordance with Illustrative Embodiment 3 includes at least steps S21 to S28.

Steps S21 to S23 are the same as steps S11 to S13 in Illustrative Embodiment 2. Steps S25 to S28 are the same as steps S15 to S18 in Illustrative Embodiment 2. Therefore, descriptions of those steps will be omitted here.

In S24, the path assignment section 12 divides and assigns the path to a plurality of wavelengths, in accordance with an attribute of the path.

For example, in an aspect, assume a case where the attribute of the path is a specific attribute which indicates that the path is to be preferentially assigned to the first wavelength region Y (e.g., the attribute of a broadband path). In this case, if no wavelength of the first wavelength region Y is available in a free region which is common to cores that have been extracted by the core extraction section 11, the path assignment section 12 may divide the path into two paths of bands each of which is half an original band, and assign the two paths to respective wavelengths X1 and X2 of the second wavelength region X.

Alternatively, in an aspect, in a case where the attribute of the path is a spare system path and an active path has been already assigned to the wavelength Y1 of the first wavelength region Y, the path assignment section 12 may divide the spare system path (protection path) into two paths of bands each of which is half an original band, and assign the two paths to the wavelengths X1 and X2 of the second wavelength region X.

Illustrative Embodiment 4

The following will discuss in detail Illustrative Embodiment 4 of the present invention, with reference to drawings. Note that any constituent element that is identical in function to a constituent element described in any of the above Illustrative Embodiments 1 to 3 is given the same reference numeral, and a description thereof will be omitted where appropriate.

An optical network system 1 and an optical network management device 100 in accordance with Illustrative Embodiment 4 are configured as in any of Illustrative Embodiments 1 to 3. In Illustrative Embodiment 4, the following will discuss a configuration in which a storage section 20 stores information indicating an attribute of a path and information indicating a wavelength characteristic of an optical transmission channel 102 (wavelength characteristic of an optical amplifier 105), and a path assignment section 12 assigns the path with reference to the information.

In Illustrative Embodiment 4, the path assignment section 12 assigns a path with reference to the information indicating the attribute of the path and the information indicating the wavelength characteristic of the optical transmission channel 102 (wavelength characteristic of the optical amplifier 105), the information being stored in the storage section 20. This makes it possible to efficiently assign the path in accordance with the attribute of the path, in view of the wavelength characteristic of the optical transmission channel 102. The following will discuss a detailed example.

Figure 11:
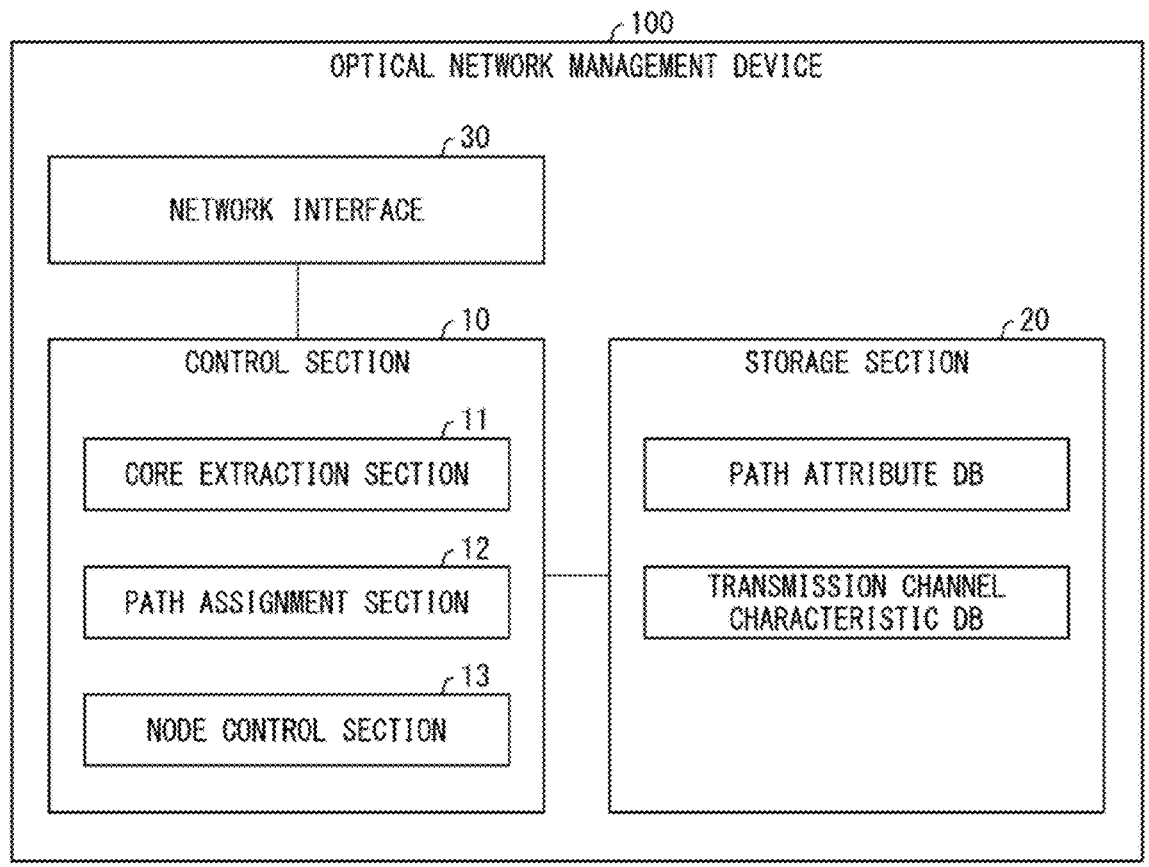
FIG. 11 is a block diagram illustrating an example of a configuration of an optical network management device in accordance with Illustrative Embodiment 4 of the present invention.

FIG. 11 is a block diagram illustrating an example of a configuration of the optical network management device 100 in accordance with Illustrative Embodiment 4. As shown in FIG. 11, in the storage section 20, stored are a path attribute database that retains a band, a distance, etc. of the path (active path or protection path), and a transmission channel characteristic database that retains transmission characteristics such as amplification gains, noise figures (NFs), etc. of respective wavelengths in the optical transmission channel 102.

With reference to the path attribute database and the transmission channel characteristic database which are stored in the storage section 20, the path assignment section 12 obtains a band(s), a wavelength(s) and the number of wavelengths, each of which can be allocated. On the basis of a result of this obtainment, the path assignment section 12 assigns a path.

Specifically, in step S2 in Illustrative Embodiment 1, step S14 in Illustrative Embodiment 2, and step S24 in Illustrative Embodiment 3, the path assignment section 12 first refers to the path attribute database which is stored in the storage section 20, and obtains attributes of the path such as a band of the path, a level of importance of the path, a type of the path, and a distance of the path which corresponds to a core which has been extracted by a core extraction section 11. Next, the path assignment section 12 refers to the transmission channel characteristic database, and obtains transmission characteristics such as the amplification gain, the NF, etc. which correspond to the wavelength that is common to each core which has been extracted by the core extraction section 11. Next, the path assignment section 12 obtains a band(s), a wavelength(s) and the number of wavelengths, each of which can be allocated, and allocates a suitable wavelength(s) in accordance with the attributes of the path.

Software Implementation Example

Some or all of functions of the optical network management device 100 can be realized by hardware provided in an integrated circuit (IC chip) or the like or can be alternatively realized by software.

Figure 15:
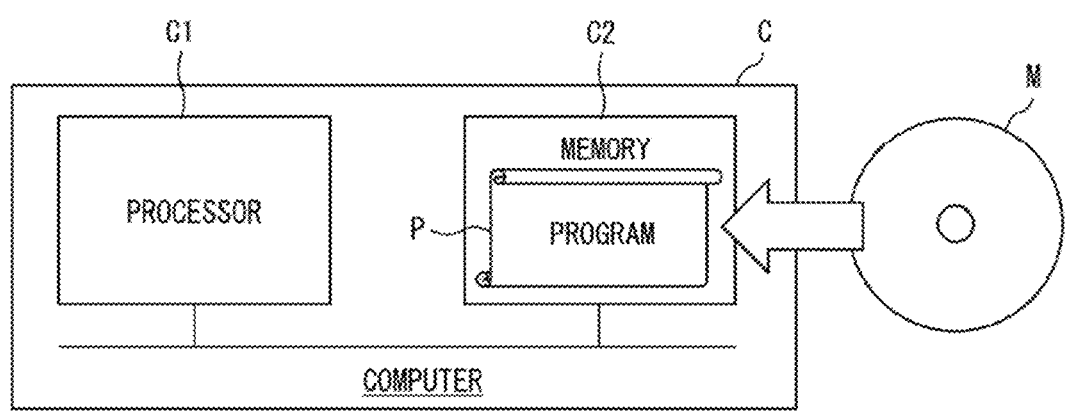
FIG. 15 is a block diagram illustrating an example of a hardware configuration of an optical network management device in accordance with each illustrative embodiment of the present invention.

In the latter case, the optical network management device 100 is realized by, for example, a computer which executes instructions of a program that is software for implementing functions of the optical network management device 100. FIG. 15 illustrates an example of such a computer (hereinafter, referred to as "computer C"). The computer C includes at least one processor C1 and at least one memory C2. The memory C2 stores a program P for causing the computer C to operate as the optical network management device 100. In the computer C, the processor C1 reads the program P from the memory C2 and executes the program P, so that the functions of the optical network management device 100 are implemented.

Examples of the processor C1 encompass a central processing unit (CPU), a graphic processing unit (GPU), a digital signal processor (DSP), a micro processing unit (MPU), a floating point number processing unit (FPU), a physics processing unit (PU), a micro controller, and a combination thereof. Examples of the memory C2 encompass a flash memory, a hard disk drive (HDD), a solid state drive (SSD), and a combination thereof.

Note that the computer C can further include a random access memory (RAM), in which the program P is loaded when the program P is to be executed and in which various kinds of data are temporarily stored. The computer C can further include a communication interface through which data can be transmitted to and received from another device. The computer C can further include an input/output interface through which an input/output device(s) such as a keyboard and a mouse and/or a display and a printer is/are connected to the computer C.

The program P can be stored in a non-transitory, tangible storage medium M capable of being read by the computer C. Examples of such a storage medium M encompass a tape, a disk, a card, a semiconductor memory, and a programmable logic circuit. The computer C can obtain the program P via the storage medium M. Alternatively, the program P can be transmitted via a transmission medium. Examples of such a transmission medium encompass a communication network and a broadcast wave. The computer C can also obtain the program P via the transmission medium.

[Supplementary Matter 1]

The present invention is not limited to the above embodiments, but can be altered by a person skilled in the art within the scope of the claims. The present invention also encompasses, in its technical scope, any embodiment derived by combining technical means disclosed in differing embodiments described above.

[Supplementary Matter 2]

Some or all of the above embodiments can be described as below. Note however that the present invention is not limited to aspects described below.

(Supplementary Note 1)

An optical network management device which assigns a path from a transmitting node to a receiving node in an optical network system including a multi-core optical fiber, the optical network management device including:

a core extraction section configured to extract a core constituting the path; and a path assignment section configured to select, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the path assignment section preferentially assigning, to the first wavelength region, the path having a specific attribute.

According to the above configuration, it is possible to assign a path in accordance with an attribute of the path, in view of a wavelength characteristic of an optical transmission channel. Consequently, it is possible to enhance wavelength utilization efficiency in the optical network system including the multi-core optical fiber.

(Supplementary Note 2)

The optical network management device described in Supplementary note 1, wherein the path assignment section preferentially assigns, to the second wavelength region, the path having an attribute different from the specific attribute.

According to the above configuration, paths are separately assigned to a wavelength region having a large amplification gain and to a wavelength region having a small amplification gain. This makes it possible to further enhance the wavelength utilization efficiency in the optical network system including the multi-core optical fiber.

(Supplementary Note 3)

The optical network management device described in Supplementary note 1 or 2, wherein the attribute of the path includes a band of the path.

The above-described configuration makes it possible to assign a path in accordance with a band of the path, in view of a wavelength characteristic of an optical transmission channel.

(Supplementary Note 4)

The optical network management device described in any one of Supplementary notes 1 to 3, wherein the attribute of the path includes a level of importance of the path.

The above-described configuration makes it possible to assign a path in accordance with the level of importance of the path, in view of a wavelength characteristic of an optical transmission channel.

(Supplementary Note 5)

The optical network management device described in any one of Supplementary notes 1 to 4, wherein the attribute of the path includes whether the path is an active system path or a spare system path.

The above-described configuration makes it possible to assign a path in accordance with whether the path is an active system path or a spare system path, in view of a wavelength characteristic of an optical transmission channel.

(Supplementary Note 6)

The optical network management device described in any one of Supplementary notes 1 to 5, wherein the path assignment section divides a path into paths of a plurality of wavelengths and preferentially assigning the paths to the second wavelength region.

The above-described configuration makes it possible to efficiently assign even a broadband path, by dividing the path.

(Supplementary Note 7)

The optical network management device described in any one of Supplementary notes 1 to 6, further including a storage section in which information indicating the attribute of the path and information indicating a wavelength characteristic of the optical amplifier is stored, the path assignment section assigning the path with reference to the information stored in the storage section.

The above configuration makes it possible to efficiently assign a path in accordance with the attribute of the path, in view of a wavelength characteristic of an optical transmission channel, with reference to the information indicating the attribute of the path and the information indicating the wavelength characteristic of the optical amplifier.

(Supplementary Note 8)

An optical network system including:

an optical network management device described in any one of Supplementary notes 1 to 7;

an optical transmission channel including the multi-core optical fiber; and nodes connected via the optical transmission channel.

This system yields an effect similar to that of Supplementary note 1.

(Supplementary Note 9)

An optical network management method for assigning a path from a transmitting node to a receiving node in an optical network system including a multi-core optical fiber, the optical network management method including the steps of:

extracting a core constituting the path; and selecting, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the step of selecting a wavelength to which the path is to be assigned including preferentially assigning, to the first wavelength region, the path having a specific attribute.

This method yields an effect similar to that of Supplementary note 1.

(Supplementary Note 10)

An optical network management program for causing a computer to function as an optical network management device which assigns a path from a transmitting node to a receiving node in an optical network system including a multi-core optical fiber, the program causing the computer to function as:

a core extraction section configured to extract a core constituting the path; and a path assignment section configured to select, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the path assignment section being configured to preferentially assign, to the first wavelength region, the path having a specific attribute.

This program yields an effect similar to that of Supplementary note 1.

[Supplementary Matter 3]

Further, some or all of the above illustrative embodiments can also be described as below.

An optical network management device which assigns a path from a transmitting node to a receiving node in an optical network system including a multi-core optical fiber, the optical network management device including at least one processor, the processor being configured to carry out: a core extraction process of extracting a core constituting the path; and a path assignment process of selecting, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the path assignment process including preferentially assigning, to the first wavelength region, the path having a specific attribute.

Note that this optical network management device may further include a memory. In this memory, a program for causing the processor to carry out the core extraction process and the path assignment process may be stored. Alternatively, the program may be stored in a non-transitory, tangible storage medium capable of being read by a computer.

REFERENCE SIGNS LIST 1 optical network system
10 control section
11 core extraction section
12 path assignment section
13 node control section
20 storage section
30 network interface
100 optical network management device
101 node
102 optical transmission channel
103 ring
104 connection link
105 amplifier
201 node controller
202 transponder
203 wavelength switch 204 fiber switch
205 single-core optical fiber
206 FAN-IN
207 multi-core optical fiber
208 FAN-OUT
209 tap coupler
210 monitor

The invention claimed is:

1. An optical network management device which assigns a path from a transmitting node to a receiving node in an optical network system including a multi-core optical fiber, the optical network management device comprising at least one processor,
the processor being configured to carry out:
a core extraction process of extracting a core constituting the path; and
a path assignment process of selecting, in accordance with an attribute of the path, a wavelength to which the path is to be assigned,
the multi-core optical fiber having an optical amplifier attached thereto, the optical amplifier having an amplification gain that is larger in a first wavelength region than in a second wavelength region,
the path assignment process including preferentially assigning, to the first wavelength region, the path having a specific attribute.

2. The optical network management device according to claim 1, wherein the path assignment step includes preferentially assigning, to the second wavelength region, the path having an attribute different from the specific attribute.

3. The optical network management device according to claim 1, wherein the attribute of the path includes a band of the path.

4. The optical network management device according to claim 1, wherein the attribute of the path includes a level of importance of the path.

5. The optical network management device according to claim 1, wherein the attribute of the path includes whether the path is an active system path or a spare system path.

6. The optical network management device according to claim 1, wherein the path assignment process includes dividing a path into paths of a plurality of wavelengths and preferentially assigning the paths to the second wavelength region.

7. The optical network management device according to claim 1, further comprising a storage section in which information indicating the attribute of the path and information indicating a wavelength characteristic of the optical amplifier is stored,
the path assignment process including assigning the path with reference to the information stored in the storage section.

8. An optical network management method for assigning a path from a transmitting node to a receiving node in an optical network system including a multi-core optical fiber, the optical network management method comprising the steps of:
extracting a core constituting the path; and
selecting, in accordance with an attribute of the path, a wavelength to which the path is to be assigned,
the multi-core optical fiber having an optical amplifier attached thereto,
the optical amplifier having an amplification gain that is larger in a first wavelength region than in a second wavelength region,
the step of selecting a wavelength to which the path is to be assigned including preferentially assigning, to the first wavelength region, the path having a specific attribute.

9. A non-transitory storage medium in which an optical network management program is stored, the optical network management program being for causing a computer to function as an optical network management device which assigns a path from a transmitting node to a receiving node in an optical network system including a multi-core optical fiber, the program causing the computer to function as a core extraction section configured to extract a core constituting the path, and a path assignment section configured to select, in accordance with an attribute of the path, a wavelength to which the path is to be assigned, the multi-core optical fiber having an optical amplifier attached thereto, the optical amplifier having an amplification gain that is larger in a first wavelength region than in a second wavelength region, the path assignment section being configured to preferentially assign, to the first wavelength region, the path having a specific attribute.

* * * * *